(12) United States Patent
Fragassi

(10) Patent No.: US 12,703,168 B2
(45) Date of Patent: Aug. 11, 2026

(54) REFLECTIVE GLASS DISPLAYS AND ASSOCIATED METHODS FOR MANUFACTURING REFLECTIVE GLASS DISPLAYS

(71) Applicant: Pittsburgh Glass Works LLC, Cheswick, PA (US)

(72) Inventor: Kyle Fragassi, Pittsburgh, PA (US)

(73) Assignee: Pittsburgh Glass Works, LLC, Cheswick, PA (US)

( * ) Notice: Subject to any disclaimer, the term of this patent is extended or adjusted under 35 U.S.C. 154(b) by 393 days.

(21) Appl. No.: 18/364,224

(22) Filed: Aug. 2, 2023

(65) Prior Publication Data

US 2024/0042725 A1 Feb. 8, 2024

Related U.S. Application Data

(60) Provisional application No. 63/380,958, filed on Oct. 26, 2022, provisional application No. 63/370,720, filed on Aug. 8, 2022.

(51) Int. Cl.
*B32B 7/12* (2006.01)
*B32B 3/04* (2006.01)
(Continued)

(52) U.S. Cl.
CPC .................. *B32B 3/04* (2013.01); *B32B 7/12* (2013.01); *B32B 17/10036* (2013.01); *B32B 17/1077* (2013.01); *B32B 17/10871* (2013.01); *B32B 37/003* (2013.01); *B32B 37/06* (2013.01); *B32B 37/10* (2013.01); *G02F 1/16757* (2019.01); *G02F 1/1677* (2019.01); *B32B 2305/34* (2013.01); *B32B 2315/08* (2013.01); *B32B 2375/00* (2013.01); *G02F 2001/1678* (2013.01)

(58) Field of Classification Search
CPC .... B32B 3/18; B32B 3/20; B32B 3/22; B32B 3/30; B32B 3/266; B32B 7/12; B32B 17/10036
See application file for complete search history.

(56) References Cited

U.S. PATENT DOCUMENTS 11,220,076 B2 * 1/2022 Wang ................ B32B 17/10733
2013/0299820 A1 * 11/2013 Miyamoto ........... H10D 64/685
257/43

(Continued)

FOREIGN PATENT DOCUMENTS

CN 215322261 U 12/2021
EP 1491941 A2 12/2004

(Continued)

OTHER PUBLICATIONS

Kim et al., "Stretchable and reflective displays: materials, technologies and strategies," Nano Convergence, 2019, 24 pages, vol. 6:21.

*Primary Examiner* — Elizabeth E Mulvaney
(74) *Attorney, Agent, or Firm* — The Webb Law Firm

(57) ABSTRACT

A glass article includes a first glass substrate having a No. 1 surface and a No. 2 surface opposite the No. 1 surface, a second glass substrate opposed from the first glass substrate, the second glass substrate having a No. 3 surface that faces towards the No. 2 surface and a No. 4 surface opposite the No. 3 surface, and a display positioned between the first glass substrate and the second glass substrate.

8 Claims, 7 Drawing Sheets

(51) Int. Cl.

| | |
|---|---|
| ***B32B 17/10*** | (2006.01) |
| ***B32B 37/00*** | (2006.01) |
| ***B32B 37/06*** | (2006.01) |
| ***B32B 37/10*** | (2006.01) |
| ***G02F 1/16757*** | (2019.01) |
| ***G02F 1/1677*** | (2019.01) |
| *G02F 1/1675* | (2019.01) |

(56) References Cited

U.S. PATENT DOCUMENTS

| | | | | |
|---|---|---|---|---|
| 2020/0331248 | A1* | 10/2020 | Nemeth | G02F 1/1339 |
| 2022/0123084 | A1* | 4/2022 | Yatim | B32B 17/10541 |

FOREIGN PATENT DOCUMENTS

| | | | | |
|---|---|---|---|---|
| EP | 3778517 | A1 | | 2/2021 |
| WO | WO 2007/122427 | | * | 11/2007 |
| WO | WO2021015170 | | * | 1/2021 |

* cited by examiner

REFLECTIVE GLASS DISPLAYS AND ASSOCIATED METHODS FOR MANUFACTURING REFLECTIVE GLASS DISPLAYS

CROSS-REFERENCE TO RELATED APPLICATIONS

This application claims the benefit of U.S. Provisional Patent Application No. 63/370,720, filed Aug. 8, 2022, and U.S. Provisional Patent Application No. 63/380,958, filed Oct. 26, 2022, the disclosures of which are hereby incorporated by reference in their entirety.

BACKGROUND

Field

The present application relates generally to glass articles and, more specifically, to reflective glass displays and associated methods for manufacturing reflective glass displays.

Technical Considerations

Displays, such as reflective or emissive displays, commonly used for personal electronic devices, such as e-readers and tablets, may be useful in other applications to share information. Glass, while on its own is passive, has potential for actively displaying information in various architectural and automotive applications. Drawbacks to current materials used to manufacture glass articles, such as laminated glass articles, and more particularly automotive grade glass windows, include high temperatures required to process the materials. The temperatures required for curing and processing materials commonly used in laminated glass articles, particularly automotive grade glass windows, would likely damage displays, such as reflective or emissive displays.

Accordingly, those skilled in the art continue research and development in the field of reflective glass displays and associated methods for manufacturing reflective glass displays.

SUMMARY

Disclosed are glass articles.

In an example, the glass article includes a first glass substrate having a No. 1 surface and a No. 2 surface opposite the No. 1 surface. The glass article further includes a second glass substrate opposed from the first glass substrate, the second glass substrate having a No. 3 surface that faces towards the No. 2 surface and a No. 4 surface opposite the No. 3 surface. The glass substrate further includes a display positioned between the first glass substrate and the second glass substrate.

Also disclosed are laminated glass articles.

In an example, the laminated glass article includes a first glass substrate having a No. 1 surface and a No. 2 surface opposite the No. 1 surface. The laminated glass article further includes a second glass substrate opposed from the first glass substrate, the second glass substrate having a No. 3 surface that faces towards the No. 2 surface and a No. 4 surface opposite the No. 3 surface. The laminated glass article further includes a middle interlayer positioned between the first glass substrate and the second glass substrate, the middle interlayer defining an opening configured to receive a display. The laminated glass article further includes a first interlayer positioned between the first glass substrate and the middle interlayer and a second interlayer positioned between the second glass substrate and the middle interlayer.

Also disclosed are automobiles.

In an example, the automobile includes a laminated glass article. The laminated glass article includes a first glass substrate having a No. 1 surface and a No. 2 surface opposite the No. 1 surface. The laminated glass article further includes a second glass substrate opposed from the first glass substrate, the second glass substrate having a No. 3 surface that faces towards the No. 2 surface and a No. 4 surface opposite the No. 3 surface. The laminated glass article further includes a middle interlayer positioned between the first glass substrate and the second glass substrate, the middle interlayer defining an opening configured to receive a display. The laminated glass article further includes a first interlayer positioned between the first glass substrate and the middle interlayer and a second interlayer positioned between the second glass substrate and the middle interlayer.

Also disclosed are methods for manufacturing a laminated glass article including a first glass substrate, a second glass substrate opposed from the first glass substrate, a first interlayer positioned between the first glass substrate and the second glass substrate, and a second interlayer positioned between the second glass substrate and the first interlayer.

In an example, the method includes positioning a middle interlayer between the first interlayer and the second interlayer to yield a stacked article, removing air from the stacked article for a predetermined period of time, heating the stacked article to a temperature between approximately 200° F. and approximately 300° F. for a second predetermined period of time, heating the stacked article to a second temperature between approximately 200° F. and approximately 300° F. for a third predetermined period of time, and subjecting the stacked article to a pressure between approximately 150 PSI and approximately 200 PSI for a fourth predetermined period of time.

Other examples will become apparent from the following detailed description, the accompanying drawings, and the appended claims.

BRIEF DESCRIPTION OF THE DRAWINGS

The disclosure will be described with reference to the following drawing figures wherein like reference numbers identify like parts throughout.

DETAILED DESCRIPTION

Figure 1:
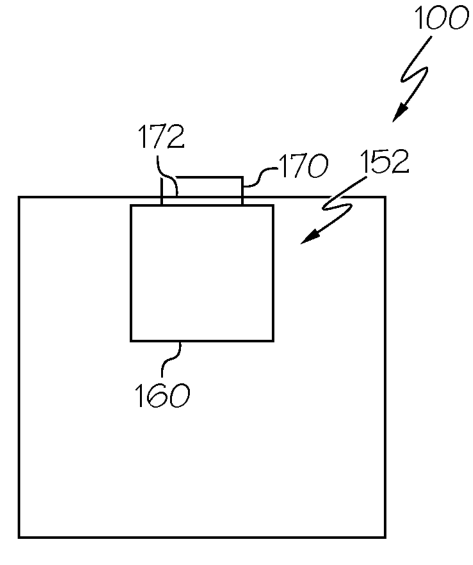
FIG. 1 is a front cross-sectional schematic (not to scale) of a glass article.

As used herein, spatial or directional terms, such as "left", "right", "inner", "outer", "above", "below", and the like, relate to the disclosure as it is shown in the drawing figures. However, it is to be understood that the disclosure can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "approximately" or "about". Accordingly, unless indicated to the contrary, the numerical values set forth in the following specification and claims may vary depending upon the desired properties sought to be obtained by the present disclosure. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. "A" or "an" refers to one or more.

As used herein, "coupled", "coupling", and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

Figure 2:
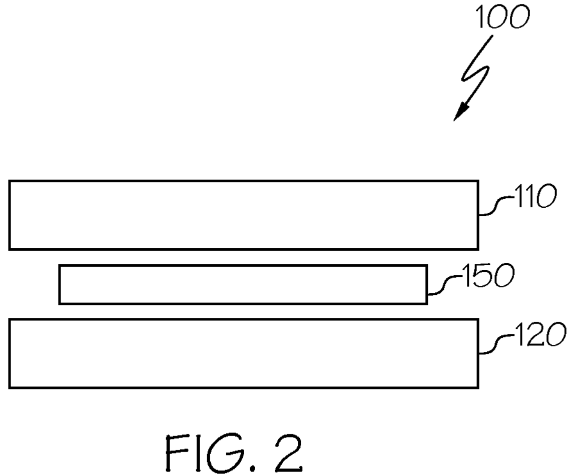
FIG. 2 is a top cross-sectional view (not to scale) of a glass article.

Referring to FIG. 1, disclosed is a glass article 100. The glass article may be useful for architectural applications or may be laminated for use in locomotive applications, such as in automobiles. Referring to FIG. 2, the glass article 100 includes a first glass substrate 110 comprising a No. 1 surface and a No. 2 surface opposite the No. 1 surface. The glass article 100 further includes a second glass substrate 120 opposed from the first glass substrate 110. The second glass substrate 120 comprises a No. 3 surface that faces towards the No. 2 surface, and a No. 4 surface opposite the No. 3 surface. In one example, the first glass substrate 110 and the second glass substrate 120 comprise a material suitable for automotive applications, such as clear soda lime glass.

Still referring to FIG. 1 and FIG. 2, the glass article 100 includes a display 160 positioned between the first glass substrate 110 and the second glass substrate 120. The display 160 may be any type of display 160 having requisite properties for the intended application. In one example, the display 160 is a reflective display. In another example, the display 160 is an emissive display. The display 160 may be coupled with the first glass substrate 110, the second glass substrate 120, or both the first glass substrate 110 and the second glass substrate 120. In one example, the display 160 is coupled the first glass substrate 110, the second glass substrate 120, or both the first glass substrate 110 and the second glass substrate 120 with a material having adhesive properties, such as an optically clear material.

The display 160 may have any dimensions required for the intended application. In one example, the display 160 has a thickness of approximately 0.4 mm to approximately 0.6 mm. The display 160 may further have an aspect ratio of approximately 1:1 to approximately 4:3. In one or more examples, the display 160 comprises a black and white resolution of approximately 640×480 to approximately 2560×1440. Specifically, the display 160 may comprise a black and white resolution of approximately 1920×1440. The display 160 may further be characterized by having approximately 70 to approximately 600 pixels per inch (PPI). As derived from measurements illustrated in FIG. 8, the display 160 may comprise a contrast ratio of approximately 8 to approximately 20.

Figure 5:
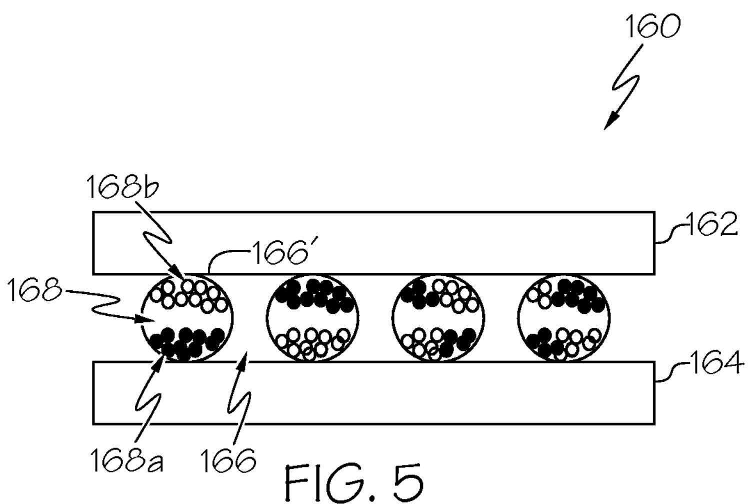
FIG. 5 is a top cross-sectional view (not to scale) of a portion of the glass article of FIG. 1.

Referring to FIG. 5, in one or more examples, the display 160 may include a first member 162, a second member 164 opposed from the first member 162, and a plurality of microcapsules 166 disposed between the first member 162 and the second member 164. The first member 162 and the second member 164 may be electrodes, wherein one of the first member 162 and the second member 164 is a positive electrode, or cathode, and the other is a negative electrode, or anode. As shown in FIG. 5, light may come through the first member 162 and reflect back through the first member 162. In one example, the display 160 further includes a polymeric border.

Still referring to FIG. 5, in one or more examples, each microcapsule 166' of the plurality of microcapsules 166 comprises a plurality of ink particles 168. The plurality of ink particles 168 may be suspended in a fluid, such as a clear fluid, to allow movement of the ink particles 168 relative to the first member 162 and the second member 164 based upon exposure to a charge. In one example, the plurality of ink particles 168 comprises a black pigment **168*a* configured to absorb light and a white pigment 168*b* configured to reflect light. In another example, the plurality of ink particles 168** comprises a colored pigment configured to absorb light.

Referring back to FIG. 3 and FIG. 4, in one or more examples, the glass article 100 further includes a middle interlayer 150. The middle interlayer 150 comprises an opening 152 configured to receive the display 160. In one example, the opening 152 is positioned in a central portion of the middle interlayer 150. In another example, the opening 152 is positioned adjacent to an edge portion of the middle interlayer 150. The middle interlayer 150 may be of any thickness required for the intended application. In one example, the middle interlayer 150 has a thickness of approximately 0.25 mm to approximately 0.7 mm. The middle interlayer 150 may include any polymeric material compatible with the intended use. In one example, the middle interlayer 150 includes a material selected from polyurethane, ethylene vinyl acetate, and polyvinyl butyral, and, more specifically, the middle interlayer 150 may comprise polyurethane.

The middle interlayer 150 may include small voids of about 1 mm on the tail edge of the display 160 to assist lining up an electronic component 170. The middle interlayer 150 may further include an approximately 3 mm overlap or tolerance between display 160 and middle interlayer 150 along the perimeter of the opening 152 to allow for variation in the sizing of the display 160. An aesthetic advance to having the overlap is that further reduces a user from seeing the inactive area of the display 160 from an angle. Accordingly, in one example, the display 160 may have an active area that is about 155×115 mm, or 149×109 mm with no dot pattern.

Figure 4:
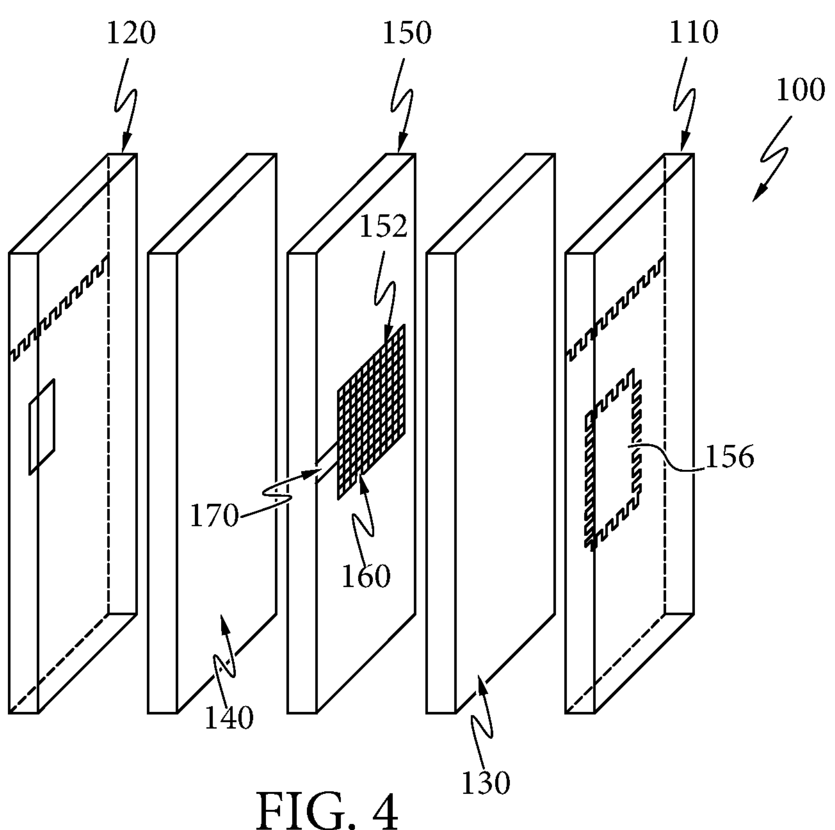
FIG. 4 is an exploded isometric view (not to scale) of the glass article of FIG. 1.

Referring to FIG. 4, in one or more examples, the glass article 100 may further include a painted portion 156 positioned over at least a portion of the No. 2 surface, the No. 3 surface, or the No. 4 surface. In one example, the painted portion is positioned to cover an area associated with the electronic component 170 associated with the display 160. In another example, the painted portion 156 is positioned to cover an area associated with the display 160. The painted portion 156 may be matched to the display 160 dark state such that the black pigment **168*a* is substantially the same as the painted portion 156**.

The electronic component 170 may include any electrically conductive material suitable for the intended application. In one example, the electronic component 170 comprises an electronic connector 172 coupled to the display 160. Further, to support and house the electronic component, at least one of the first glass substrate 110 and the second glass substrate 120 may define a cavity configured to receive the at least one electronic connector 172.

Figure 3:
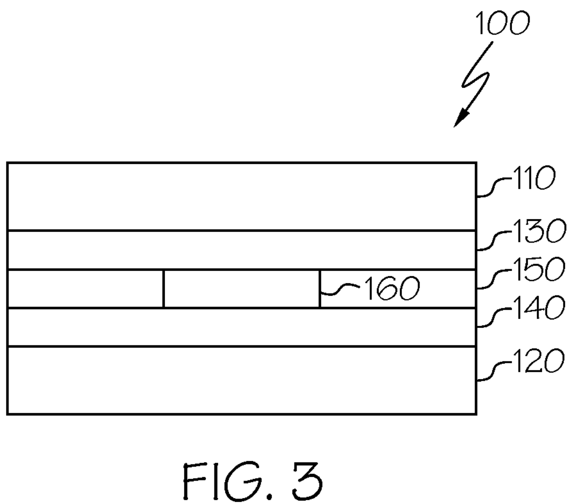
FIG. 3 is a top cross-sectional view (not to scale) of the glass article of FIG. 1.

Referring to FIG. 3, in one or more examples, the glass article 100 further includes a first interlayer 130 positioned between the No. 2 surface and the display 160 and a second interlayer 140 positioned between the No. 3 surface and the display 160. The first interlayer 130 and the second interlayer 140 may include a polymeric material, such as polyurethane, ethylene vinyl acetate, and polyvinyl butyral. In one example, at least one of the first interlayer 130 and the second interlayer 140 comprises polyurethane. In another example, both the first interlayer 130 and the second interlayer 140 comprise polyurethane.

The first interlayer 130 and the second interlayer 140 may be any thickness required for the intended application. In one example, the first interlayer 130 has a thickness of approximately mm to approximately 0.7 mm and the second interlayer has a thickness of approximately 0.25 mm to approximately 0.7 mm. In another example, the first interlayer 130 has a thickness of approximately 0.3 mm to approximately 0.6 mm and the second interlayer has a thickness of approximately 0.3 mm to approximately 0.6 mm.

In examples where the glass article 100 includes one or more of the first interlayer 130, second interlayer 140, and middle interlayer 150, the glass article 100 may, upon undergoing thermomechanical processing, become a laminated glass article 200. Examples of thermomechanical processing include exposure to elevated temperatures, pressures, and vacuum conditions, such as positioning within an autoclave. In one example, the resulting laminated glass article 200 may be an automobile 400 component. In such example, the materials selected for the laminated glass article are compliant with the requirements under the American National Standard For Safety Glazing Motor Vehicles And Motor Vehicle Equipment Operating On Land Highways ANSI/SAE Z26.

Figure 6:
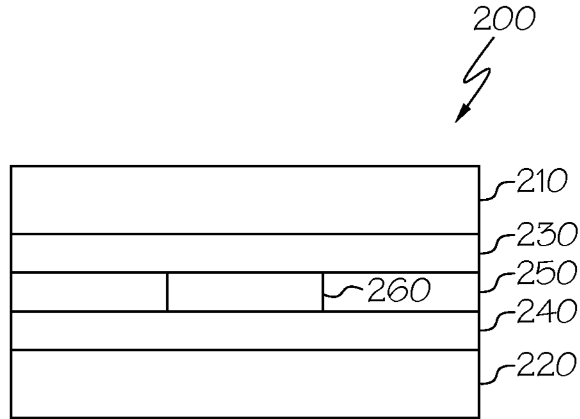
FIG. 6 is a top cross-sectional view (not to scale) of a laminated glass article.

Referring to FIG. 6, in one or more examples, disclosed is a laminated glass article 200. The laminated glass article 200 includes a first glass substrate 210 having a No. 1 surface and a No. 2 surface opposite the No. 1 surface. The laminated glass article 200 further includes a second glass substrate 220 opposed from the first glass substrate 210, the second glass substrate having a No. 3 surface that faces towards the No. 2 surface, and a No. 4 surface opposite the No. 3 surface.

Still referring to FIG. 6, the laminated glass article 200 further includes a middle interlayer 250 positioned between the first glass substrate 210 and the second glass substrate 220. The middle interlayer 250 defines an opening configured to receive a display 260, a first interlayer 230 positioned between the first glass substrate 210 and the middle interlayer 250 and a second interlayer 240 positioned between the second glass substrate 220 and the middle interlayer 250.

Figure 7:
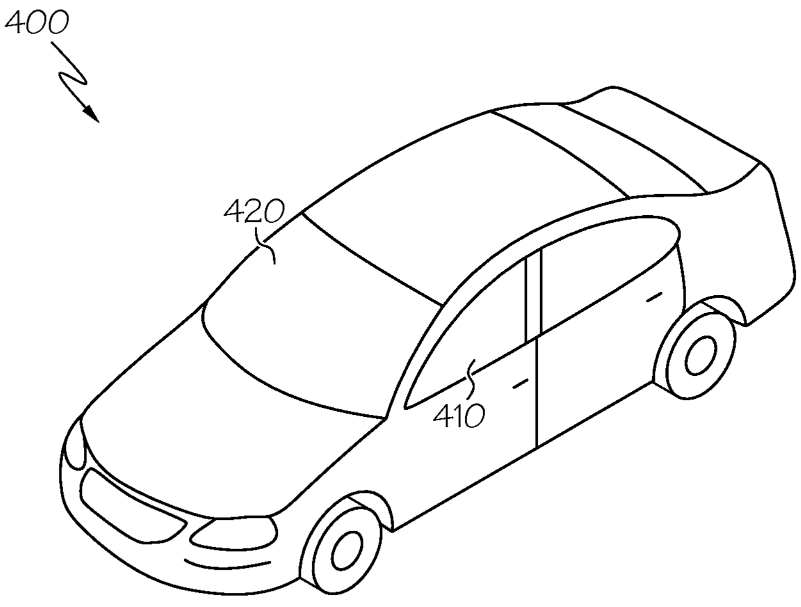
FIG. 7 is a perspective schematic (not to scale) of an automobile.

Referring to FIG. 7, disclosed is a vehicle, specifically an automobile 400, having a laminated glass article 200, FIG. 6. The laminated glass article 200 includes a first glass substrate 210 having a No. 1 surface and a No. 2 surface opposite the No. 1 surface. The laminated glass article 200 further includes a second glass substrate 220 opposed from the first glass substrate 210, the second glass substrate having a No. 3 surface that faces towards the No. 2 surface, and a No. 4 surface opposite the No. 3 surface.

Still referring to FIG. 6, the laminated glass article 200 further includes a middle interlayer 250 positioned between the first glass substrate 210 and the second glass substrate 220. The middle interlayer 250 defines an opening configured to receive a display 260, a first interlayer 230 positioned between the first glass substrate 210 and the middle interlayer 250 and a second interlayer 240 positioned between the second glass substrate 220 and the middle interlayer 250.

In one example, the laminated glass article 200 is a sidelight 410. As used herein, the term "sidelight" refers to the glass window(s) of a vehicle or an automobile 400 located adjacent to the first row of seats, i.e. the driver's row. In another example, the laminated glass article 200 is a windshield 420.

Figure 14:
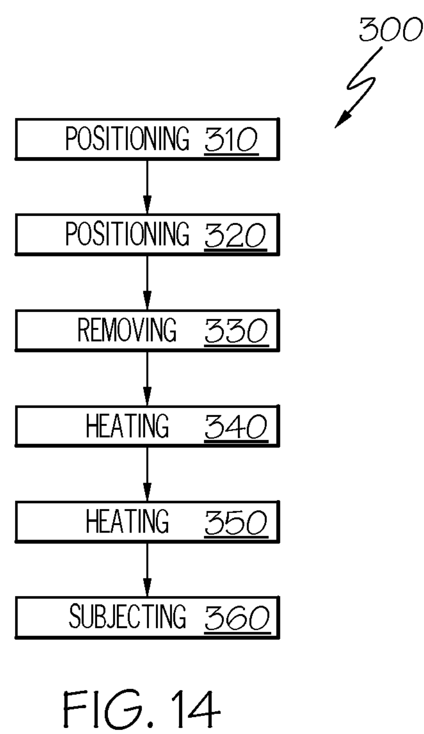
FIG. 14 is a flow chart of a method for manufacturing a laminated glass article.

Referring to FIG. 14, disclosed is a method 300 for manufacturing a laminated glass article 200, FIG. 6. The laminated glass article 200 comprises a first glass substrate 210, a second glass substrate 220 opposed from the first glass substrate 210, a first interlayer 230 positioned between the first glass substrate 210 and the second glass substrate 220, and a second interlayer 240 positioned between the second glass substrate 220 and the first interlayer 230. In one example, one or more of the first interlayer 230 and the second interlayer 240 comprises polyurethane.

Still referring to FIG. 14, the method 300 includes positioning 310 a middle interlayer 250 between the first interlayer 230 and the second interlayer 240 to yield a stacked article. In one example, the middle interlayer 250 comprises polyurethane. The middle interlayer 250 may further define an opening 252 configured to receive a display 260.

After the positioning 310, the method 300 may further include positioning 320 the stacked article in an autoclave. Positioning 320 the stacked article in an autoclave allows for exposure to elevated temperatures and pressures in an inert environment simultaneously or sequentially. The positioning 320 may be automated or may be performed manually.

The method 300 further includes removing 330 air, meaning ambient air containing oxygen, from the stacked article for a predetermined period of time. In one example, the predetermined amount of time is about 10 minutes to about 30 minutes. In another example, the predetermined period of time is about 20 minutes.

Still referring to FIG. 14, the method 300 includes heating 340 the stacked article to a temperature between approximately 200° F. and approximately 300° F., preferably between about 220° F. and about 260° F., for a second predetermined period of time. In one example, the second predetermined period of time is about 15 minutes to about 45 minutes. In another example, the second predetermined period of time is about 30 minutes.

The method 300 further includes heating 350 the stacked article to a second temperature between approximately 200° F. and approximately 300° F., preferably about 220° F. to about 260° F., for a third predetermined period of time. The second temperature may be less than the first temperature. In one example, the third predetermined period of time is about 20 minutes to about minutes. In another example, the third predetermined period of time is about 30 minutes.

The method 300 further includes subjecting 360 the stacked article to a pressure between approximately 150 PSI and approximately 200 PSI, preferably about 176 PSI, for a fourth predetermined period of time. In one example, the fourth predetermined period of time is approximately the same as the third predetermined period of time. In another example, the heating 350 and the subjecting 360 are performed concurrently.

This disclosure is further described in the following numbered clauses:

Clause 1. A glass article comprising: a first glass substrate comprising a No. 1 surface and a No. 2 surface opposite the No. 1 surface; a second glass substrate opposed from the first glass substrate, wherein the second glass substrate comprises a No. 3 surface that faces towards the No. 2 surface, and a No. 4 surface opposite the No. 3 surface; and a display positioned between the first glass substrate and the second glass substrate.

Clause 2. The glass article of clause 1, wherein the display is coupled with the first glass substrate.

Clause 3. The glass article of clause 1 or 2, wherein the display has a thickness of approximately 0.4 mm to approximately 0.6 mm.

Clause 4. The glass article of any one of clauses 1 to 3, wherein the display is a reflective display.

Clause 5. The glass article of any one of clauses 1 to 4, wherein the display comprises an aspect ratio of approximately 1:1 to approximately 4:3.

Clause 6. The glass article of any one of clauses 1 to 5, wherein the display comprises a black and white resolution of approximately 640×480 to approximately 2560×1440.

Clause 7. The glass article of any one of clauses 1 to 6, wherein the display comprises a black and white resolution of approximately 1920×1440.

Clause 8. The glass article of any one of clauses 1 to 7, wherein the display comprises approximately 70-600 PPI.

Clause 9. The glass article of any one of clauses 1 to 8, wherein the display comprises a contrast ratio of approximately 8 to approximately 20.

Clause 10. The glass article of any one of clauses 1 to 9, wherein the display comprises a polymeric border.

Clause 11. The glass article of any one of clauses 1 to 10, wherein the display comprises: a first member; a second member opposed from the first member; and a plurality of microcapsules disposed between the first member and the second member.

Clause 12. The glass article of clause 11, wherein each microcapsule of the plurality of microcapsules comprises a plurality of ink particles.

Clause 13. The glass article of clause 12, wherein the plurality of ink particles comprises: a black pigment configured to absorb light; and a white pigment configured to reflect light.

Clause 14. The glass article of clause 12 or 13, wherein the plurality of ink particles comprise a colored pigment configured to absorb light.

Clause 15. The glass article of any one of clauses 1 to 14 further comprising a middle interlayer comprising an opening configured to receive the display.

Clause 16. The glass article of clause 15, wherein the opening is positioned in a central portion of the middle interlayer.

Clause 17. The glass article of clause 15, wherein the opening is positioned adjacent to an edge portion of the middle interlayer.

Clause 18. The glass article of any one of clauses 15 to 17, wherein the middle interlayer has a thickness of approximately 0.25 mm to approximately 0.7 mm.

Clause 19. The glass article of any one of clauses 15 to 18, wherein the middle interlayer comprises polyurethane.

Clause 20. The glass article of any one of clauses 1 to 19, wherein the first glass substrate and the second glass substrate comprises clear soda lime glass.

Clause 21. The glass article of any one of clauses 1 to 20, further comprising a painted portion positioned over at least a portion of the No. 2 surface or the No. 3 surface, wherein the painted portion is positioned to cover an area associated with an electronic component associated with the display.

Clause 22. The glass article of any one of clauses 1 to 21, further comprising: a first interlayer positioned between the No. 2 surface and the display; and a second interlayer positioned between the No. 3 surface and the display.

Clause 23. The glass article of clause 22, wherein at least one of the first interlayer and the second interlayer comprises polyurethane.

Clause 24. The glass article of any one of clauses 22 to 23, wherein the first interlayer has a thickness of approximately 0.25 mm to approximately 0.7 mm.

Clause 25. The glass article of any one of clauses 22 to 24, wherein the second interlayer has a thickness of approximately 0.25 mm to approximately 0.7 mm.

Clause 26. The glass article of any one of clauses 22 to 25, wherein, upon undergoing thermomechanical processing, the glass article becomes a laminated glass article.

Clause 27. The glass article of clause 26, wherein the laminated glass article is an automobile component.

Clause 28. The glass article of clause 21, wherein the electronic component comprises an electronic connector coupled to the display.

Clause 29. The glass article of clause 28, wherein at least one of the first glass substrate and the second glass substrate defines a cavity configured to receive the at least one electronic connector.

Clause 30. A laminated glass article comprising: a first glass substrate comprising a No. 1 surface and a No. 2 surface opposite the No. 1 surface; a second glass substrate opposed from the first glass substrate, wherein the second glass substrate comprises a No. 3 surface that faces towards the No. 2 surface, and a No. 4 surface opposite the No. 3 surface; a middle interlayer positioned between the first glass substrate and the second glass substrate, the middle interlayer defining an opening configured to receive a display; a first interlayer positioned between the first glass substrate and the middle interlayer; and a second interlayer positioned between the second glass substrate and the middle interlayer.

Clause 31. An automobile comprising: a laminated glass article, the laminated glass article comprising: a first glass substrate comprising a No. 1 surface and a No. 2 surface opposite the No. 1 surface; a second glass substrate opposed from the first glass substrate, wherein the second glass substrate comprises a No. 3 surface that faces towards the No. 2 surface, and a No. 4 surface opposite the No. 3 surface; a middle interlayer positioned between the first glass substrate and the second glass substrate, the middle interlayer defining an opening configured to receive a display; a first interlayer positioned between the first glass substrate and the middle interlayer; and a second interlayer positioned between the second glass substrate and the middle interlayer.

Clause 32. The automobile of clause 31, wherein the laminated glass article is a sidelight.

Clause 33. The automobile of clause 31, wherein the laminated glass article is a windshield.

Clause 34. A method for manufacturing a laminated glass article comprising a first glass substrate, a second glass substrate opposed from the first glass substrate, a first interlayer positioned between the first glass substrate and the second glass substrate, and a second interlayer positioned between the second glass substrate and the first interlayer, the method comprising: positioning a middle interlayer between the first interlayer and the second interlayer to yield a stacked article; removing air from the stacked article for a predetermined period of time; heating the stacked article to a temperature between approximately 200° F. and approximately 300° F. for a second predetermined period of time; heating the stacked article to a second temperature between approximately 200° F. and approximately 300° F. for a third predetermined period of time; an subjecting the stacked article to a pressure between approximately 150 PSI and approximately 200 PSI for a fourth predetermined period of time.

Clause 35. The method of clause 34, further comprising positioning the stacked article in an autoclave.

Clause 36. The method of clause 34 or 35, wherein the one or more of the first interlayer, the second interlayer, and the middle interlayer comprises polyurethane.

Clause 37. The method of any one of clauses 34 to 36, wherein the predetermined period of time is about 10 minutes to about 30 minutes.

Clause 38. The method of any one of clauses 34 to 37, wherein the second predetermined period of time is about 15 minutes to about 45 minutes.

Clause 39. The method of any one of clauses 34 to 38, wherein the third predetermined period of time is about 20 minutes to about 40 minutes.

Clause 40. The method of any one of clauses 34 to 39, wherein the fourth predetermined period of time is approximately the same as the third predetermined period of time.

Clause 41. The method of any one of clauses 34 to 40, wherein the temperature is between approximately 220° F. and approximately 260° F.

Clause 42. The method of any one of clauses 34 to 41, wherein the second temperature is between approximately 220° F. and approximately 250° F.

Clause 43. The method of any one of clauses 34 to 42, wherein the heating and the subjecting are performed concurrently.

Clause 44. The method of any one of clauses 34 to 43, wherein the middle interlayer comprises a display.

EXAMPLES

The following examples are examples of reflective displays before and after being incorporated into laminated glass articles according to the present disclosure. While the examples describe laminated glass, it is understood that the reflective displays may be utilized to other glass articles, such as architectural glass.

The examples include samples that were tested under accelerated conditions to UV, temperature, and humidity. Five samples were prototyped and tested for aesthetics. All other samples were made without a painted portion in order to better detect failures.

TABLE 1

| Unlaminated | L* | a* | b* |
|---|---|---|---|
| Black | 16 | −0.22 | −4.1 |
| White | 72 | −2.4 | −0.81 |

TABLE 2

| Laminated | L* | a* | b* |
|---|---|---|---|
| Black | 13 | −0.87 | −3.2 |
| White | 53 | −2.0 | −1.3 |

Figure 8:
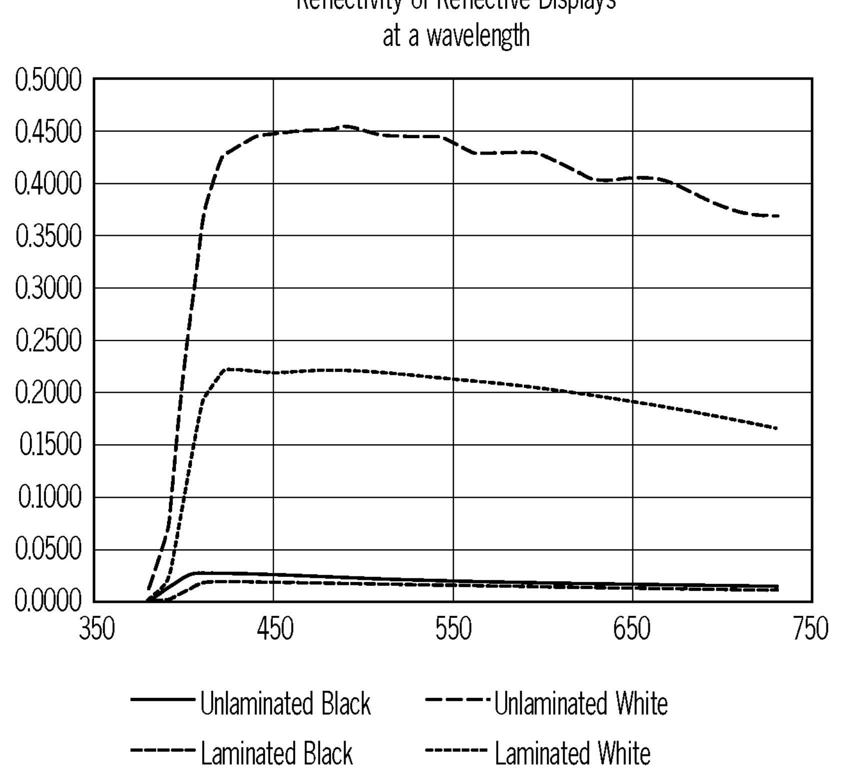
FIG. 8 is a graph illustrating reflectivity of laminated and non-laminated reflective displays.

The graph of FIG. 8 illustrates reflectivity of laminated and non-laminated reflective displays. TABLES 1 and 2 show results recorded. The contrast ratio measurements were calculated from L* values converted to reflectivity. The clear soda lime glass used in the first glass substrate 210 and the second glass substrate 220 absorbed a portion of light prior to hitting the display 160 and again absorbed a portion of the reflected light. It is noted that glass reflectivity also contributes to removing a portion of light. Typical L*a*b* prior to lamination are: Black: 16, −0.22, −4.1 and White: 72, −2.4, −0.81.

Typical L*a*b* after lamination are: Black: 13, −0.87, −3.2 and White: 53, −2.0, −1.3. The recorded data shows that the contrast ratio decreased from 20.6 to 13.3 when the display is positioned in a laminated glass article, which is still within a desired range.

TABLE 3

| Hot Storage | L* | a* | b* |
|---|---|---|---|
| Pre Test Black | 13.51 | −0.91 | −3.05 |
| Pre Test White | 52.91 | −2.01 | −1.39 |
| Post Test Black | 13.69 | −0.96 | −2.93 |
| Post Test White | 53.03 | −2.04 | −1.27 |

TABLE 4

| Cold Storage | L* | a* | b* |
|---|---|---|---|
| Pre Test Black | 13.50 | −0.91 | −3.05 |
| Pre Test White | 52.99 | −2.03 | −1.32 |
| Post Test Black | 13.31 | −0.89 | −3.06 |
| Post Test White | 53.23 | −2.05 | −1.29 |

TABLE 5

| Temp. Cycle | L* | a* | b* |
|---|---|---|---|
| Pre Test Black | 13.59 | −0.93 | −3.04 |
| Pre Test White | 52.99 | −2.06 | −1.27 |
| Post Test Black | 13.54 | −0.96 | −2.95 |
| Post Test White | 53.08 | −2.06 | −1.27 |

Figure 9:
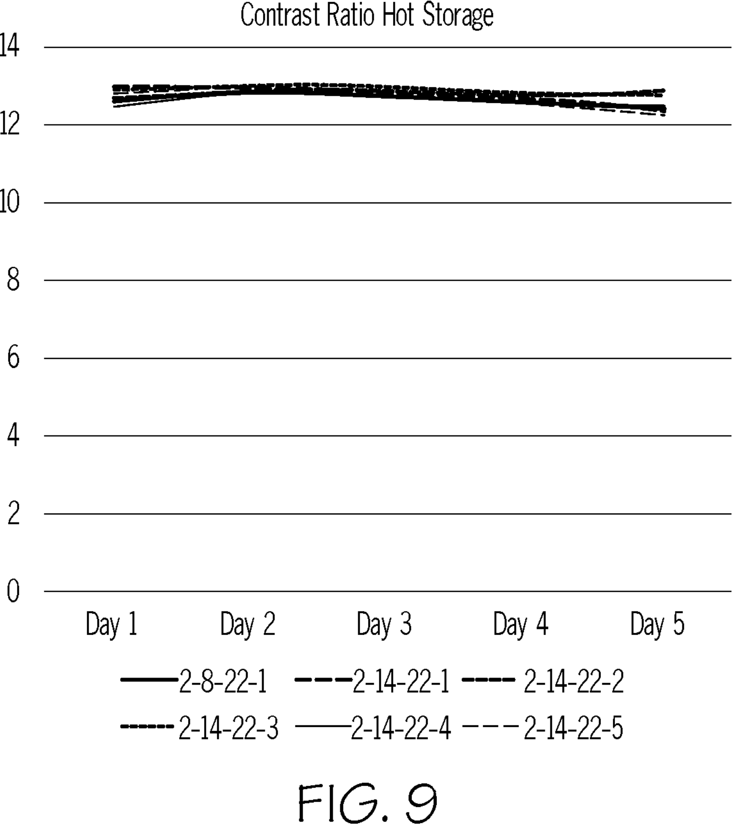
FIG. 9 is a graph illustrating contrast ratios of laminated glass articles.
Figure 10:
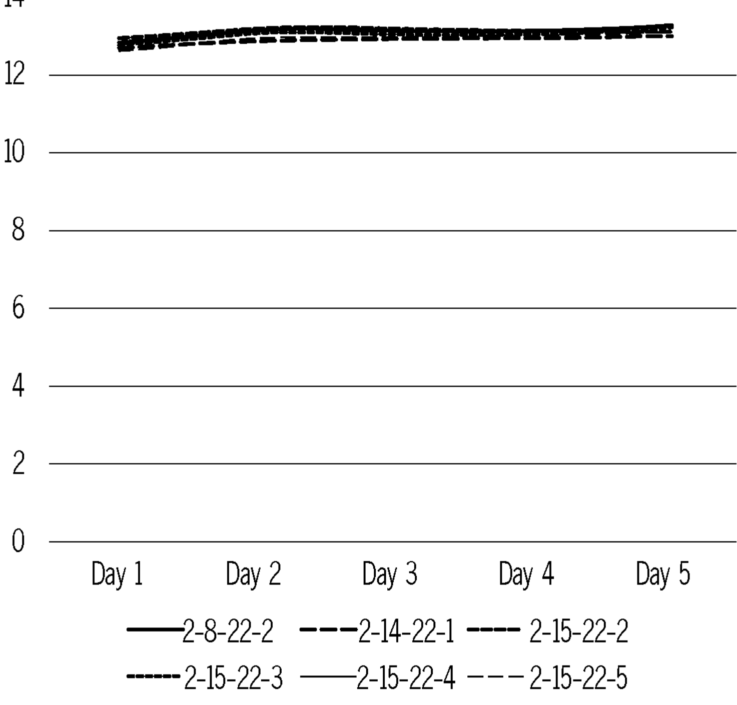
FIG. 10 is a graph illustrating contrast ratios of laminated glass articles.
Figure 11:
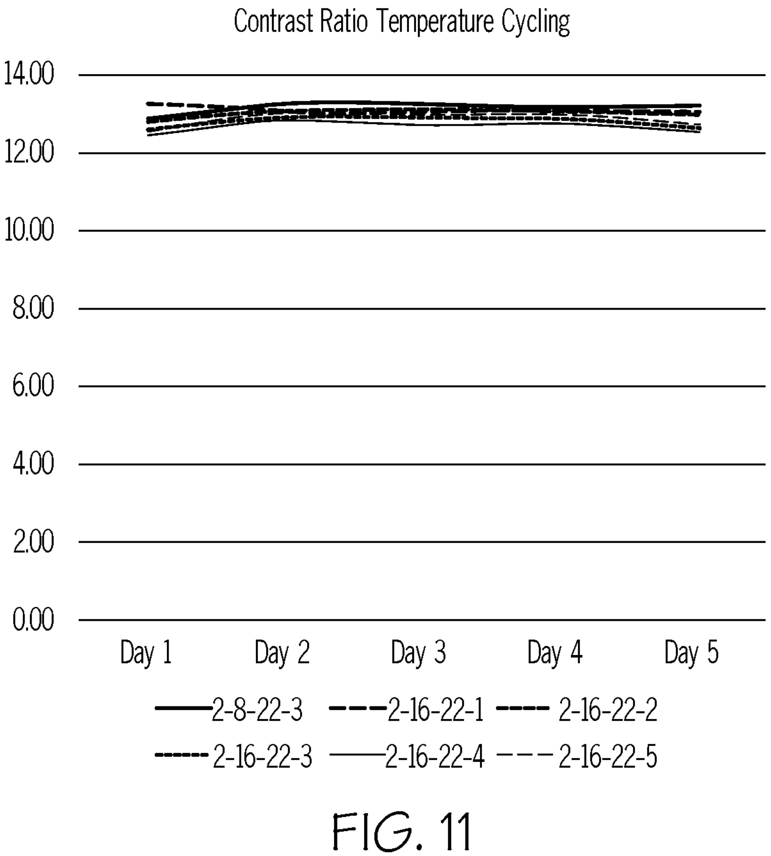
FIG. 11 is a graph illustrating contrast ratios of laminated glass articles.

For temperature testing, 8" samples were tested in various temperature conditions ranging from 85° C. to −30° C. For hot storage durability, samples were heated to 85° C. for about 20 hours, returned to ambient temperature, about 23° C., for 4 hours, then evaluated for optical and appearance within an hour. Testing was repeated for four cycles. For cold storage durability, samples were cooled to −30° C. for about 20 hours, returned to ambient temperature, about 23° C., for 4 hours, then evaluated for optical and appearance within an hour. Testing was repeated for four cycles. For temperature cycling, samples were heated to 85° C. for about 20 hours, returned to ambient temperature, about 23° C., for 4 hours, then evaluated for optical and appearance within an hour, then cooled to −30° C. for about 20 hours, returned to ambient temperature, about 23° C., for 4 hours, then evaluated for optical and appearance within an hour. Testing was repeated for two cycles. Overall, as illustrated in FIGS. 9-11, contrast ratios remained within margin of error across all samples. Further, L*, a*, and b* values before and after testing can be seen in TABLES 3-5.

Figure 12:
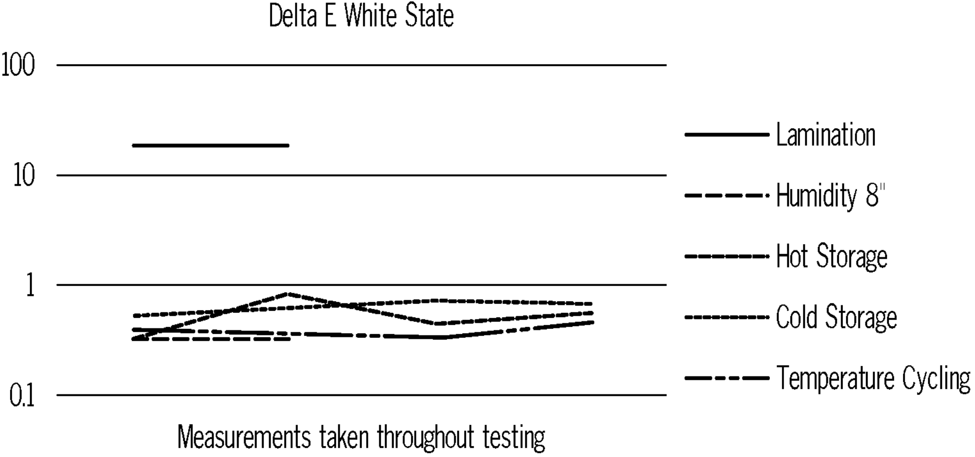
FIG. 12 is a graph illustrating delta E white state values of displays.
Figure 13:
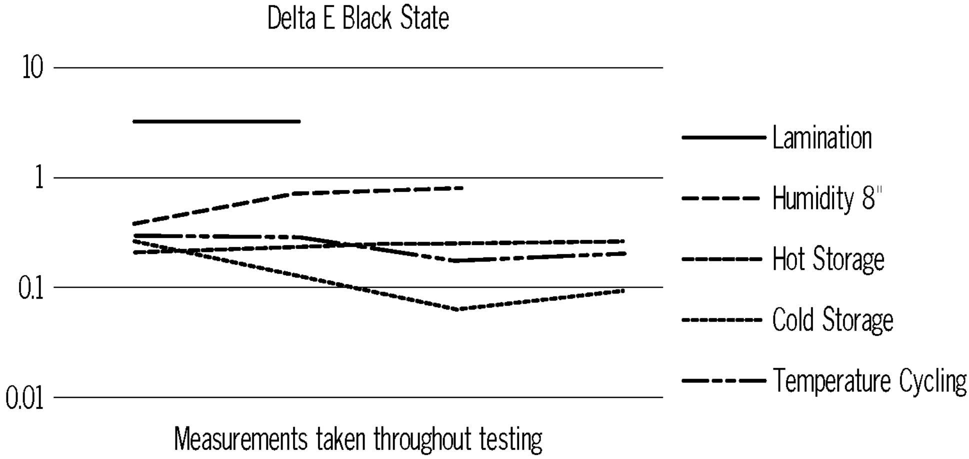
FIG. 13 is a graph illustrating delta E black state values of displays.

Delta E was documented throughout experimentation as well, see FIGS. 12 and 13. Apart from laminating the display into glass, the delta E was below 1 for all measured samples, within the performance requirements of less than 3. Deltas were derived by taking the pre-test L*a*b* and the L*a*b* at a given point during testing using the CIE76 formula. For humidity testing, samples were visually inspected for degradation. No degradation issues were observed for the 8" samples tested.

Accordingly, as shown in the tables above and in FIGS. 8-13, the contrast ratio of the samples met the requirements of >8, the samples passed hot and cold storage testing, and the samples passed temperature cycle testing.

It will be readily appreciated by those skilled in the art that modifications may be made to the disclosure without departing from the concepts disclosed in the foregoing description. Accordingly, the particular examples described in detail herein are illustrative only and are not limiting to the scope of the disclosure, which is to be given the full breadth of the appended claims and any and all equivalents thereof.

What is claimed is:

1. A method for manufacturing a laminated glass article comprising a first glass substrate, a second glass substrate opposed from the first glass substrate, a first interlayer positioned between the first glass substrate and the second glass substrate, and a second interlayer positioned between the second glass substrate and the first interlayer, the method comprising:

positioning a middle interlayer between the first interlayer and the second interlayer to yield a stacked article;

removing air from the stacked article for a predetermined period of time;

heating the stacked article to a temperature between approximately 200° F. and approximately 300° F. for a second predetermined period of time;

heating the stacked article to a second temperature between approximately 200° F. and approximately 300° F. for a third predetermined period of time; and subjecting the stacked article to a pressure between approximately 150PSI and approximately 200PSI for a fourth predetermined period of time.

2. The method of claim 1, wherein the one or more of the first interlayer, the second interlayer, and the middle interlayer comprises polyurethane.

3. The method of claim 1, wherein the predetermined period of time is about 10 minutes to about 30 minutes.

4. The method of claim 1, wherein the second predetermined period of time is about 15 minutes to about 45 minutes.

5. The method of claim 1, wherein the third predetermined period of time is about 20 minutes to about 40 minutes.

6. The method of claim 1, wherein the fourth predetermined period of time is approximately the same as the third predetermined period of time.

7. The method of claim 1, wherein the temperature is between approximately 220° F. and approximately 260° F.

8. The method of claim 1, wherein the second temperature is between approximately 220° F. and approximately 250° F.

* * * * *